United States Patent [19]
Dalton et al.

[11] Patent Number: 4,752,061
[45] Date of Patent: Jun. 21, 1988

[54] INFRARED HEATING OF FLUIDIZED BED FURNACE

[75] Inventors: Roger Dalton; James E. Heath, both of Mississauga, Canada

[73] Assignee: Samuel Strapping Systems Limited, Mississauga, Canada

[21] Appl. No.: 889,518

[22] Filed: Sep. 8, 1986

[30] Foreign Application Priority Data

Aug. 7, 1985 [CA] Canada ................................. 488243
Aug. 7, 1985 [CA] Canada ................................. 488245

[51] Int. Cl.$^4$ ............................................. C21D 9/567
[52] U.S. Cl. ...................................... 266/87; 266/252; 266/103
[58] Field of Search ................ 219/354, 553; 266/249, 266/87, 251, 103, 252; 432/58

[56] References Cited

U.S. PATENT DOCUMENTS 3,404,874 10/1968 Wynne ................................ 219/354
4,249,889 2/1981 Kemp .................................. 432/11
4,604,055 8/1986 Mackenzie ......................... 432/58

OTHER PUBLICATIONS

Procedyne Corp., "Gas vs Electric Heating in Fluidized Bed Furnaces" ©1982.
Staffin H, "Continuous Wire Oil Tempering in a Fluidized Bed Furnace, Cont. Proc. Wire Assoc. Int. 5/81 pp. 21-37.

Primary Examiner—Christopher W. Brody

[57] ABSTRACT

A fluidized bed for treating of product at high temperatures (1100° C. to 1300° C.) is possible, while overcoming problems such as slow start up times and contamination due to combustion gas. The fluidized bed uses an inert gas introduced to the bed to cause fluidization of refractory particles. Exposed surfaces or boundary layers of the bed are heated by infrared radiation produced exterior to the bed and absorbed by exposed particles of the bed. The thermal characteristics of the bed insure rapid dissipation of the absorbed energy. Electrically powered lamps produce the radiation and preferably are high intensity shortwave infrared radiation lamps. The lamps remain out of direct contact with the bed preferrably separated by a quartz wall or screen.

8 Claims, 3 Drawing Sheets

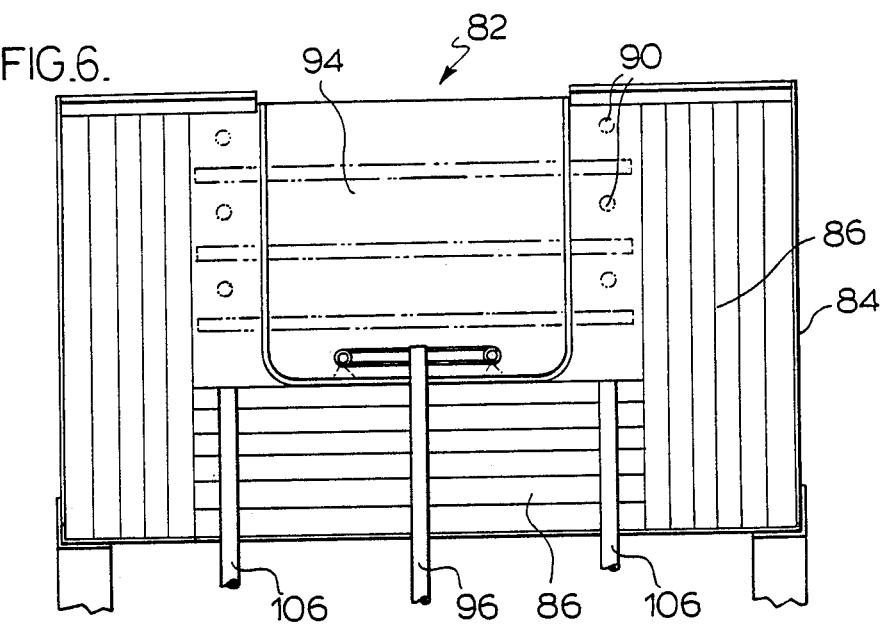
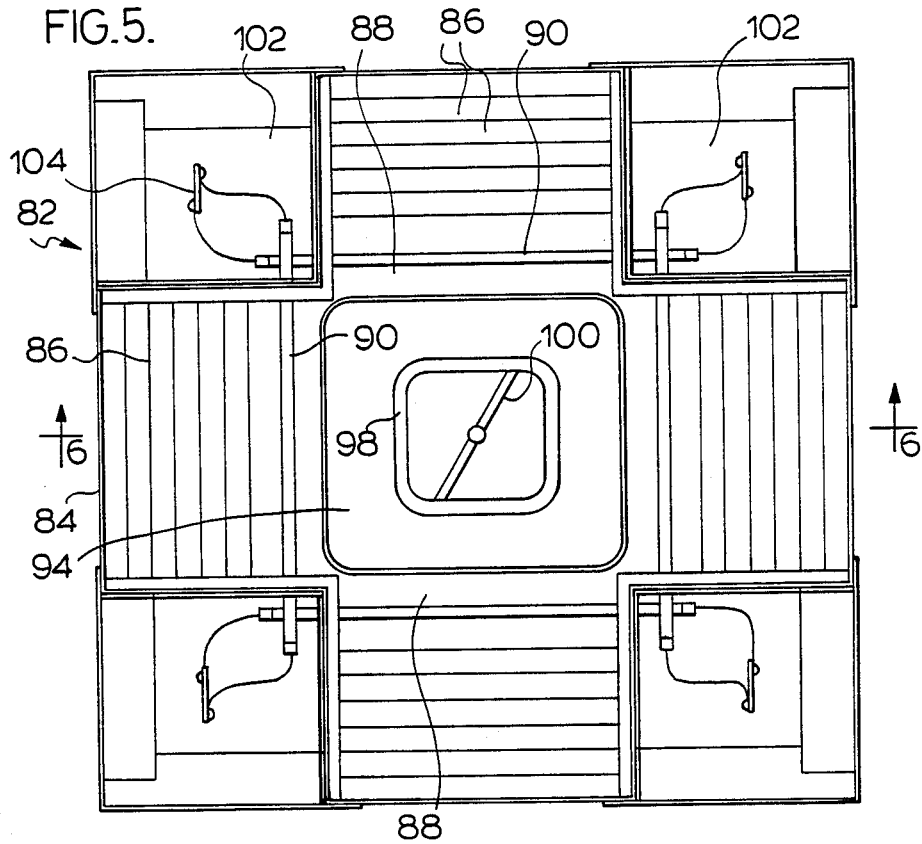

INFRARED HEATING OF FLUIDIZED BED FURNACE

BACKGROUND OF THE INVENTION

The present invention relates to improvements in the controlled heat treating of products and in particular the controlled heat treating of products by means of a fluidized bed heated from the exterior thereof.

The improved heating of a fluidized bed furnace is suitable for use in the continuous processing of a strip configured product by passing the product through the furnace and is also suitable for the batch treating of products at high temperatures, for example high speed cutting steels. Infrared radiation lamps directly heat a boundary layer of particles of the fluidized bed and the excellent thermal transfer characteristics of the bed cause the rapid dissipation of this energy throughout the bed. Thus, the radiation emitted by the lamps is radiated to the particles of the bed forming a boundary layer whereafter heat is dissipated throughout the bed by the action of the bed.

A number of advantages result from this unique combination such as the heat treating of high speed steel products, in a non contaminating fluidized bed at temperatures in the range of 1100° C. to 1300° C.; excellent control with respect to the heat energy being imparted to the bed by varying the electrical energy to the lamps and thereby directly vary the radiation absorbed by the exposed boundary layer of the particles; and improved start up characteristics whereby delays experienced in bringing a fluidized bed to operating temperature are reduced.

Heat treatment of metals in fluidized beds with or without a controlled atmosphere have been proposed for many applications and the history of fluidized beds and the various techniques are well described in an article by R. W. Reynoldson, published in the publication Heat Treatment of Metals, 1977.1, entitled Control Atmosphere Fluidized Bed for Heat Treatment of Metals. In this article, a fluidized bed furnace is shown where internal resistance heating elements are placed within a fluidized bed for the batch treating of a product. The article also refers to various types of combustion processes which may be carried out within and/or above a fluidized bed. Generally, fluidized beds heated by combustion have an operating temperature somewhere between 600° and 800° C. and are not suitable for high temperature application.

In fluidized beds and in the heat treating of any product, it is important to provide uniform heating and it is also important to provide a system which is capable of fast start up.

A substantial amount of research has been undertaken with respect to introducing of a combustible gas to a fluidized bed in a manner where the gas assists in the fluidization of the bed while also providing the proper gas mixture to support combustion within the bed. In cases where a controlled atmosphere is required, the combustion process is still carried out within a portion to heat some of the particles which are then stripped from the combustion gases and returned to the fluidized bed for heating of the remaining particles of the bed and heating of the product being treated. In this way, the product being treated is isolated from the atmosphere required to support combustion.

The demands placed on the heating source of the fluidized bed should be capable of rapidly raising the temperature of the fluid bed from ambient to the heat treat temperature, preferably up to about 1200° C. In addition, the heating source should be capable of providing uniform heating of the bed once the bed has arrived at its operating temperature. To date, the ability to rapidly raise the temperature of the fluid bed to operating levels and thereafter maintain it in a manner such that the uniform heating of products is accomplished, has been achieved with fluidized beds, but problems occur with gas fired beds at the upper temperatures.

Heat treating at high temperatures in the order of 1100° C. to 1300° C. and particularly heat treating of high speed steel, has been generally confined to molten salt baths which are hazardous materials to the environment and are dangerous in the work place. Some attempts have been made to use fluidized beds for high temperature heat treating of high speed steel. One proposal with respect to fluidized beds is to use electrically conductive fluid bed particles and to heat the fluidized bed electrically using the electrical resistance of the particles. This method is not suitable with materials to be treated which are conductive.

High temperature fluidized bed are possible using externally electrically heated retorts. Electrical resistance heaters are disposed about the exterior of the retort to heat the walls thereof which in turn heat the fluid bed particulate. Such beds have long startup times and the life expectancy of the electrical heaters is short at these high temperatures. If metal retorts are used, problems with breakdown can occur.

SUMMARY OF THE INVENTION

We have found that it is possible to provide uniform and rapid heating of a bed of fluidized refractory particles for the heat treating of product on a batch or continuous basis, by using high intensity infrared radiation lamps exposed to particles of the fluidized bed forming a boundary layer with this boundary layer of particles absorbing emitted radiation. This system allows the fluidizing gas to be separated from the initial heating step as the energy is transmitted to the particles of the bed by radiation, resulting in efficient and rapid heat transfer. The thermal characteristics of the bed rapidly dissipate the absorbed radiation to the rest of the bed. The high intensity infrared radiation lamps are capable of operating at maximum power to rapidly raise the temperature of a fluidized bed and are capable of operating at reduced power settings to provide uniform heating of the bed. The heating of the boundary layer of the bed by infrared radiation and the thermal transfer characteristics of the bed cooperate to effect rapid and uniform heat transfer throughout the length, width and depth of the bed. The radiation emitted by the lamps can be controlled by adjusting the power input to the lamps and preferably the lamps, in a continuous process, are disposed along the length of the bed to initially expose the surface of the bed. This furnace is particularly suited for heat treating or heating of product at temperatures in excess of 800° C.

The systems preferably uses high intensity infrared radiation lamps. These lamps are capable of providing a very high initial input energy to the bed to achieve operating temperature and thereafter, the output is reduced to a level of radiation sufficient to maintain the desired fluid bed temperature. With this system, accurate temperature control of the fluidized bed is achieve in combination with reduced start up time.

In the treating of products at high temperatures, for example, treating high speed steels on a batch basis at temperatures in the range of 1100° C. to 1300° C. a retort having quartz walls is preferably used with high intensity infrared radiation lamps disposed exterior to the quartz wall. The quartz walls of the retort expose a larger boundary layer of bed particles which can directly absorb infrared radiation.

Apparatus according to the invention is suitable for heat treating of metal products such as wire, strip material and special section elongate strip material on a continuous basis as the product is passed through the fluidized bed heated by infrared radiation.

The apparatus comprises a normal fluidized bed of suitable refractory particles fluidized by a suitable gas with a surface of the bed being exposed to high intensity infrared radiation for heating thereof. Infrared radiation sources are positioned above the bed and emit the radiation which is absorbed by the particles. The absorbed energy is quickly dissipated throughout the bed due to the thermal transfer characteristics of fluidized beds. This combination provides a heated fluidized bed which is highly temperature responsive to increasing levels of radiation varied by controlling the input energy to the radiation source. The product being treated is passed through the bed preferably out of direct contact with the emitted radiation. In contrast to beds heated by combustion the particles are primarily heated by radiation and or conductance.

BRIEF DESCRIPTION OF THE DRAWINGS

Preferred embodiments of the invention are shown in the drawings wherein;

FIG. 5 is a top view of a modified heat treating apparatus; and

FIG. 6 is a section taken along line 6—6 of FIG. 5.

DETAILED DESCRIPTION OF THE PREFERRED EMBODIMENT

Figure 1:
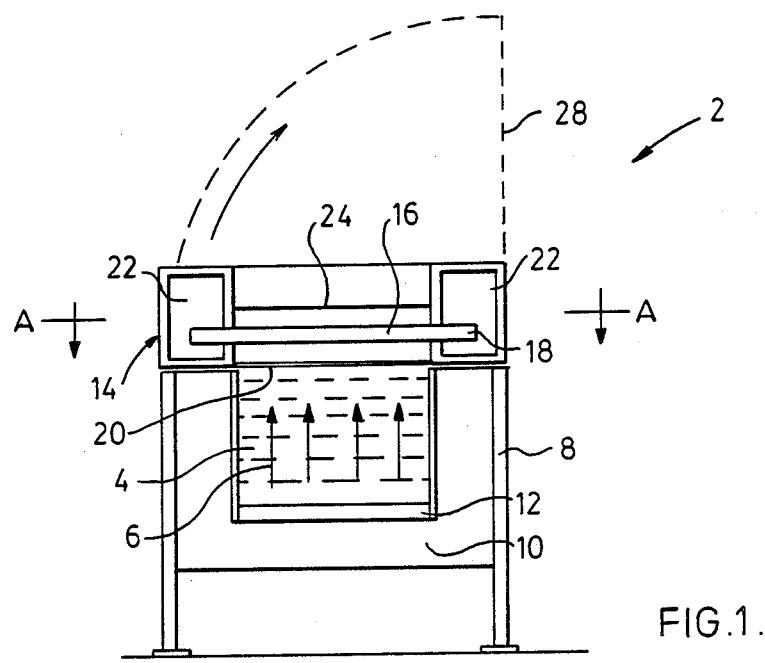
FIG. 1 is a sectional view through fluidized bed furnace suitable for the continuous treating of strip product.
Figure 2:
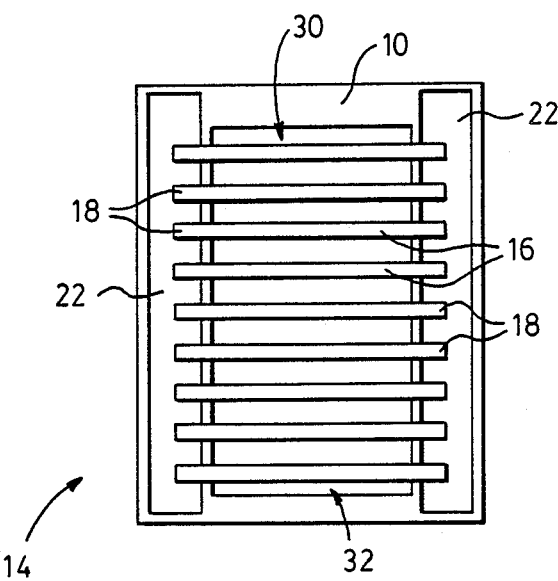
FIG. 2 is a sectional view taken along line A—A of FIG. 1.

The channel-type fluidized bed furnace generally indicated as 2 has a fluidized bed generally indicated as 4, including refractory particles or the like fluidized by the gas flow generally indicated as 6. The fluidized gas will be selected in accordance with the post processing surface conditions sought to be obtained and the product being treated. This gas is introduced in any of a number of known manners adjacent the base of the refractory insulation material 10. Exterior to the insulation material, is an exterior steel sheel and section case 8 which includes suitable means for supporting the furnace. In this case, a fluidized gas inlet 12 is provided at the upper surface of the base of the refractory insulation material 10.

Heating of the fluidized bed is accomplished by an infrared radiation source generally indicated as 14. This radiation source includes high intensity infrared radiation lamps 16 positioned generally immediately above the surface of the fluidized bed 4. The lamp end tips 18 have been located within cooling conduits 22 for cooling of the lamp ends. A cooling gas is circulated through the conduits 22 to maintain the lamp end tips at a lower temperature and thereby increase the life of the lamps. Above the lamps 16 and intermediate the cooling conduits 22 is a top panel 24 which has a lower surface exposed to the infrared radiation lamps which is preferrably of a material and shape to redirect radiation emitted by the lamps which strikes the panel, downwardly to the surface of the fluidized bed 4.

The channel-type fluid bed furnace 2 has an entrance generally indicated as 30 and a exit generally indicated as 32 for introducing and withdrawing a product from the fluidized bed.

In some cases, submerged rollers or other devices may be required to maintain the introduced product submerged and out of direct contact with emitted radiation as it is passed throughout the length of the furnace 2.

The product which is passed through the fluidized bed furnace may be wire, strip and the like and can be pushed or pulled through the furnace depending upon the actual product. The product is heated as it is moved from the entrance 30 to the exit 32 to leave the fluid bed furnace at an approximate given temperature. The fluidized bed of particles serves to isolate the product being treated from the emitted radiation of the infrared radiation source 14. It can be appreciated treating of other products are possible and the application is not limited to strip and wire.

The particles of the fluidized bed are preferrably aluminum or zirconium oxide particles, although other refractory particles may be suitable. The fluid bed particles in addition to the normal characteristics required in any fluidized bed application should tend to absorb infrared radiation impinged thereon and should not be highly reflective to this radiation.

The spacing of the high intensity infrared radiation lamps 16 along the length of the fluid bed furnace can vary depending upon the maximum temperature capability of the furnace, however, it has been found that if lamps extend across the bed and are spaced from one another approximately one to four inches along the length of the bed, rapid heating of the fluidized bed from ambient to operating temperatures is possible.

With the system described above, the infrared radiation lamps directly heat the surface of the fluidized bed and the absorbed infrared radiation is quickly transmitted throughout the fluidized bed due to the thermal transfer characteristics of the bed. It has been found that the infrared radiation lamps and particularly high intensity electrically powered shortwave infrared radiation lamps are capable of rapidly raising the temperature of the bed to an operating temperature in the range of a maximum of about 1200° C. if top heating is used, and thereafter the power supplied to the lamps can be reduced to a level sufficient to maintain the bed at the desired temperature. The response characteristics of the infrared radiation lamps in accordance with the electrical power supplied to the lamps is thus controlled to quickly raise the bed to operating temperature and thereafter maintain the same to provide even inform heat distribution throughout the fluidized bed. All the lamps may be controlled in unison or in groups by varying the electrical input in accordance with a sensed bed temperature. Such a system has improved operating characteristics and reduced operating costs.

In FIG. 1, the infrared radiation source is movable to a service position exposing the upper surface of the fluidized bed and exposing the infrared radiation lamps for inspection and service as shown in broken line. Preferrably, one of the cooling conduits 22 is hingedly attached to the exterior steel shell and section case 8 to allow convenient positioning of the infrared radiation 14 for service. A quartz limiting member 20 is shown in FIG. 1, and serves to isolate the lamps 16 from the hot gas flow 6 and fluid bed particles at the surface of the bed. This limiting member may not be required in all cases, however, in high temperature applications the life of the lamps can be increased.

The apparatus and method have been described with respect to a continuous process, however, the heat treating of products on a batch basis is also possible.

Figure 3:
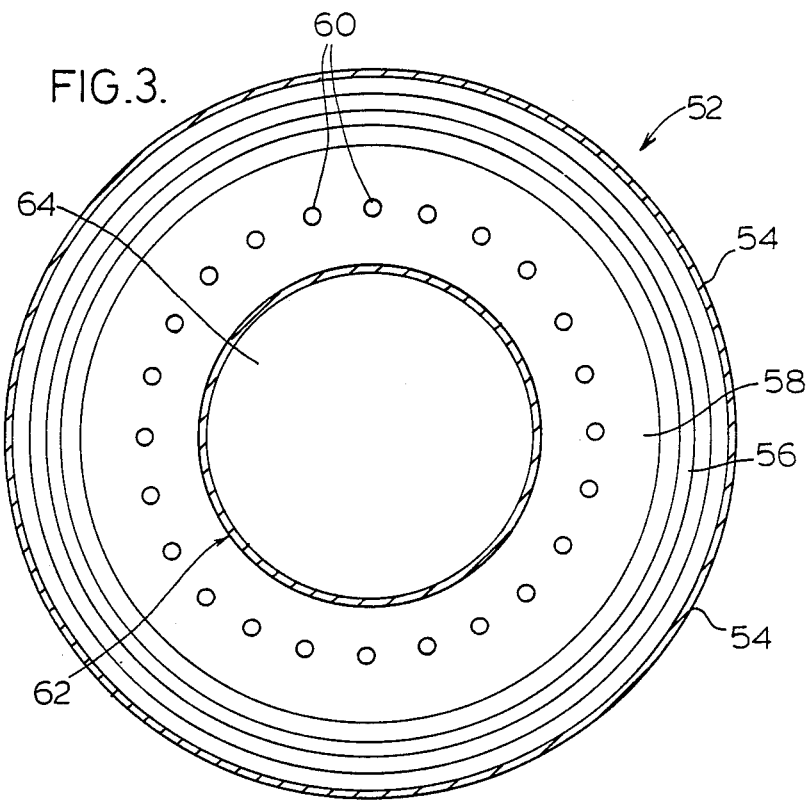
FIG. 3 is a top view of the heat treating apparatus which uses a retort having quartz walls.
Figure 4:
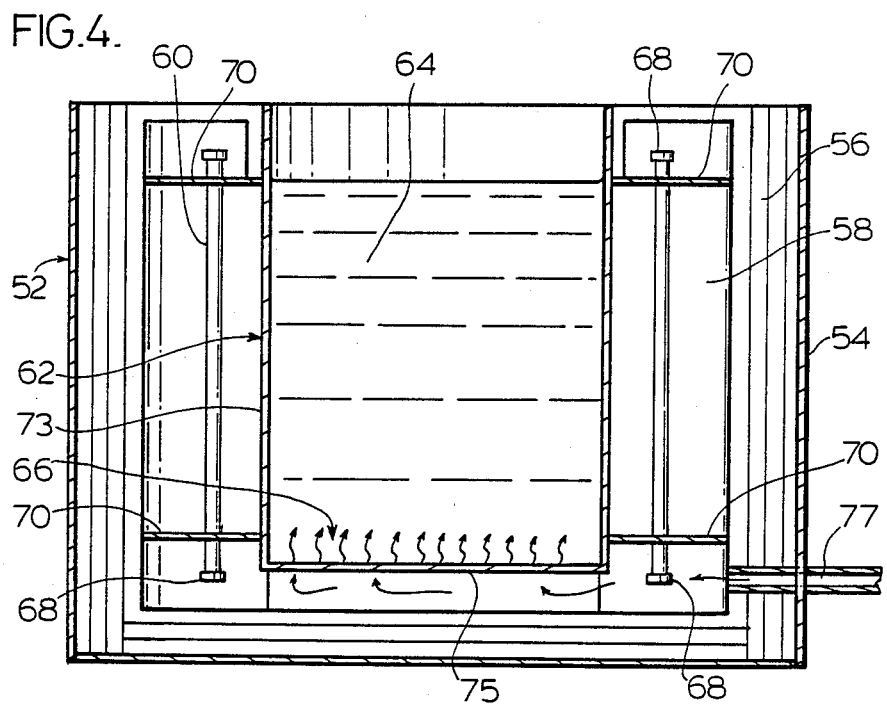
FIG. 4 is a vertical section through the apparatus of FIG. 3.

A modified batch furnace is generally shown as 52 in the FIGS. 3 and 4, has a steel furnace shell 54, surrounding refractory insulation 56 which in turn surrounds an interior chamber 58 in which high intensity shortwave infrared radiation lamps 60 are supported. These lamps 60 are spaced about the exterior of a quartz retort 62 having a bed 64 of particles capable of being fluidized. The particles are preferrably refractory grade aluminum or zirconium oxide particles and the like, although not limited thereto as any fluidizable particles may be used which would remain inert to the product being treated when heated to a temperature in the range of 1100° C. to 1300° C., and absorb infrared radiation. In order to fluidize the particles, a flow of nitrogen gas or other suitable inert gas indicated by arrows 66 is introduced through inlet 77 adjacent the lower portion of the retort 62. The rate of the nitrogen gas flow into the fluidized bed 14 will be determined in accordance with the characteristics of the bed as in any fluidized operation. Preferably, the gas used to fluidize the bed is recycled. A gas flow is also used to cool the lamp tips 68 which have been isolated exterior to the chamber 58 by end plates 70. The lamp tips 68 should be cooled in order to increase the life expectancy of the lamps 60.

The high intensity infrared radiation lamps 60 are capable of emitting various levels of infrared radiation in accordance with the electrical power supplied thereto. The radiation emitted by the lamps is transmitted through the quartz walls 73 of the retort 62 used to maintain the fluid bed 64. Quartz is essentially transparent to the infrared radiation and will allow the radiation to pass therethrough and strike a boundary layer of the fluidized bed 64 adjacent the walls 73 of the retort 62. The heat energy resulting from the radiation absorbed by the particles is quickly dissipated throughout the fluidized bed due to the action of the bed resulting in even temperature distribution. The quartz walls 73 of the retort 62 are relatively stable with respect to thermal expansion rendering them suitable for this high temperature application.

Various methods for fluidizing of the bed can be used in the present application and the application is not limited to any particular method of introducing the nitrogen gas or other inert fluidizing gas to the bed. For example, the base 75 of the retort 62 could be provided with distribution plates or porous tile to allow the fluidizing gas to pass therethrough into the bed 64 or the gas could be introduced through distribution tubes located in the bed 64 above the base 75 of the retort 62.

The furnace 52 as shown in FIGS. 3 and 4, is suitable for batch treating of high speed steels and the like, where the product is introduced into the fluidized bed and retained therein the required treating time. In order to increase the effectiveness of the infrared radiation lamps 60, reflectors may be associated therewith for redirecting radiation emitted by the lamps back towards the quartz walls 73 of retort 62. Some cooling of these reflectors may be desired and if necessary, an air flow can be provided to remove heat from the back of the reflectors. The quartz walls of the lamps are not in direct gas contact with the fluidized bed 64 and, therefore, if cooling of the lamps is required air may be used.

The high intensity infrared radiation lamps may be placed at approximately every one to four inches about the exterior of the retort 62 and are particularly responsive to changes in input energy. This allows the radiation emitted by the lamps and absorbed by the boundary layer of the fluidized bed 64 to be controlled in an accurate manner whereby the final temperature of the fluidized bed is limited to a desired temperature range. For example, the bed temperature can be sensed and the power input to the lamps automatically adjusted in accordance with this sensed temperature. In addition, the infrared radiation lamps are capable of rapidly raising the temperature of the particles of the fluidized bed 64 as the radiation is being directly transmitted to the particles of the bed adjacent the side walls 73 of the retort and the resulting heat energy is rapidly transmitted throughout the bed. The temperature of the bed is uniform for even heating of the products being treated and the furnace is capable of being raised to the operating temperature within a short time relative to existing technology of salt baths. The capability to rapidly raise the temperature of the bed to operating levels allows the fluidized bed furnace to be shut down when not in use thereby reducing operating costs. The accurate control possible by varying the electrical power to the lamps is important as the product being treated is approaching the melting temperature and a temperature overshoot could render the materials being treated useless.

The quartz retort in addition to being essentially transparent to the infrared radiation is stable at these high temperatures and thermal expansion is not a problem.

The quartz retort isolates the lamps from the fluidizing gas and fluidizing particulate which will be at the bed operating temperature. The lamp arrangement and quartz retort also simplifies recycling of the fluidizing gas as the top surface of the bed is clear.

A modified furnace 82 is shown in FIGS. 5 and 6 and departs from the structure of FIGS. 3 and 4, in that the quartz retort 92 is generally of a square cross section and the infrared radiation lamps 90 are disposed horizontally as opposed to vertically. The furnace includes an outer steel enclosure generally shown as 84, with insulation generally indicated as 86 serving to retain or at least reduce the amount of heat lost to the atmosphere. The infrared radiation lamps are disposed in an interior chamber-like structure generally indicated as 88, with the infrared radiation lamps extending through this chamber such that the ends of the lamps are disposed exterior to the chamber. The lamp ends are disposed in corner enclosures generally shown as 102. These corner enclosures allow for cooling of the lamp tips and a cooling air flow is introduced through conduits 106. In addition, these corner enclosures 102 allow for simplified electrical connection of the lamps via the electrical fasteners generally as indicated as 104.

In the base of the quartz retort 92, a fluidizing gas inlet 96 is found to allow the introduction of nitrogen or other suitable inert gas into the fluid bed of suitable particles generally indicated as 94. Inlet 96 is connected to the cross feed tube 100 which in turn introduces gas to the distribution tube 98. The upper surface of this distribution tube is provided with a number of holes therealong through which the fluidizing gas passes.

The shape of the quartz retort of FIGS. 5 and 6 presents side surfaces more suitable for heating with the horizontally disposed infrared radiation lamps 90, and also simplifies the cooling of the lamp tips and the electrical connection of the lamps to a power supply.

The fluidized bed furnaces provide an alternative structure for low temperature applications about 600° C. or less, while having the capability to heat products to temperatures in excess of 800° C. This high temperature capability is demonstrated by the batch treating of products in the temperature range of 1100° C. to 1300° C. The time required to heat the bed to operating temperature is reduced. For example, the set-up time is less than half the time required to raise a molten salt bath to a temperature of about 800° C.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. Apparatus (2, 52, 82) for heat treating a product, said apparatus including a fluidized bed (4, 54, 94) of particles suitable for the temperature to which the product is to be heated and means for controlled heating of the fluidized bed (10, 66, 90) characterized in that said particles are retained in a retort having quartz walls, the means for heating of the fluidized bed includes a plurality of electrically powered infrared radiation lamps (10, 66, 90) spaced from said bed out of direct physical contact with said bed behind said quartz walls, said lamps being capable of producing high intensity infrared radiation, said infrared radiation lamps (10, 66, 90) being positioned such that the radiation produced by said lamps is transmitted through said quartz walls and is absorbed by exposed particles of the fluidized bed (4, 54, 94) and adjacent said quartz walls with the absorbed radiation being quickly and evenly distributed throughout the bed due to the thermal transfer characteristics of the fluidized bed (4, 54, 94), said infrared radiation lamps (10, 66, 90) being controlled to vary the emitted infrared radiation as required.

2. Apparatus as claimed in claim 1, characterized in that said fluidized bed (4, 54, 94) is adapted for the continuous heat treating of a metal product such as a wire, strip and other elongate product by passing the same through the fluidized bed (4, 54, 94), said bed including an entrance (30) at one end thereof for introducing such product to become submerged in the bed and an exit (32) at an opposite end of said bed for removing the product therefrom.

3. Apparatus as claimed in claim 2, wherein said lamps (10) are spaced apart in the range of 1 to 4 inches along essentially the length of said bed (4) and wherein the temperature of the fluidized bed may be raised from ambient to the operating temperature in a time less than about half the time required for a molten salt bath.

4. Apparatus as claimed in claim 1, including means for sensing the temperature of the bed and controlling the input electrical power to said lamps in accordance with the sensed temperature.

5. Apparatus as claimed in claim 1, wherein said fluidized bed comprises refractory grade aluminum or zirconium oxide particles (64, 94).

6. Apparatus as claimed in claim 1, including an element (12, 25, 98) for controlling the introduction of a gas used to fluidize the bed, said element being a diffuser plate (75), porous tile (75) or distribution tubes (98).

7. Apparatus as claimed in claim 1, wherein said fluidized bed is retained within a quartz retort (62, 92).

8. Apparatus as claimed in claim 1, wherein sufficient lamps are provided to effect heat treating of products in the range of 1100° C. to 1300° C.

* * * * *